(12) United States Patent
Martini et al.

(10) Patent No.: US 7,408,941 B2
(45) Date of Patent: Aug. 5, 2008

(54) METHOD FOR AUTO-ROUTING OF MULTI-HOP PSEUDOWIRES

(75) Inventors: Luca Martini, Denver, CO (US); Keyur Patel, San Jose, CA (US); Thomas D. Nadeau, Hampton, NH (US); James N. Guichard, Groton, MA (US)

(73) Assignee: Cisco Technology, Inc., San Jose, CA (US)

( * ) Notice: Subject to any disclaimer, the term of this patent is extended or adjusted under 35 U.S.C. 154(b) by 612 days.

(21) Appl. No.: 11/152,523

(22) Filed: Jun. 14, 2005

(65) Prior Publication Data

US 2006/0291445 A1    Dec. 28, 2006

(51) Int. Cl.
*H04L 12/28* (2006.01)
*H04L 12/66* (2006.01)
*G06F 15/16* (2006.01)
*G06F 15/173* (2006.01)

(52) U.S. Cl. .......... 370/395.53; 370/401; 370/469; 709/224; 709/227; 709/238; 709/249

(58) Field of Classification Search ............ 370/395.53, 370/401, 469; 709/224, 227, 238, 249
See application file for complete search history.

(56) References Cited

U.S. PATENT DOCUMENTS

| | | | |
|---|---|---|---|
| 6,963,575 B1 * | 11/2005 | Sistanizadeh et al. | 370/404 |
| 7,027,448 B2 * | 4/2006 | Feldmann et al. | 370/401 |
| 7,155,518 B2 * | 12/2006 | Forslow | 709/227 |
| 7,185,107 B1 * | 2/2007 | Cassar | 709/239 |
| 7,318,108 B2 * | 1/2008 | Sreekantiah et al. | 709/242 |
| 2002/0103631 A1 * | 8/2002 | Feldmann et al. | 703/22 |
| 2003/0123446 A1 * | 7/2003 | Muirhead et al. | 370/392 |
| 2005/0015511 A1 * | 1/2005 | Izmailov et al. | 709/238 |
| 2005/0089047 A1 * | 4/2005 | Ould-Brahim et al. | 370/395.53 |
| 2006/0029035 A1 * | 2/2006 | Chase et al. | 370/351 |
| 2006/0133265 A1 * | 6/2006 | Lee | 370/228 |

* cited by examiner

*Primary Examiner*—Alpus H Hsu
(74) *Attorney, Agent, or Firm*—Chapin IP Law, LLC; Barry W. Chapin, Esq.

(57) ABSTRACT

A method and computer system for auto-routing of multi-hop pseudowires is presented. A first Provider Edge (PE) device receives an advertisement from a layer 2 (L2) capable network device, the advertisement including routing state for reaching the L2 device. A first Border Gateway Protocol (BGP) table is populated with the routing state for the L2 capable network device which is reachable by way of an address family reserved for L2 end point reachability information. The first PE device advertises the first BGP table information within a first Service Provider (SP) network such that a multi-hop Pseudowire is capable of being established which includes the L2 capable device.

21 Claims, 4 Drawing Sheets

METHOD FOR AUTO-ROUTING OF MULTI-HOP PSEUDOWIRES

BACKGROUND

Computer networks have become ubiquitous. Computer networks include the Internet, Service Provider (SP) networks, private networks, and Local Area Networks (LANs). A network such as an SP network may include peripherally located Provider Edge (PE) routers, each of which couples to one or multiple Customer Edge (CE) routers. The PE routers are used to maintain routing and forwarding context for each customer. The CE routers may couple to private LANs associated with one or multiple customers. The private LANs are also referred to as core networks. The PE routers learn local customer routes from the CE routers and distribute remote customer routes to the CE router. The PEs use Border Gateway Protocol (BGP) to distribute customer routes to each other. To support operation, the PE routers typically maintain Virtual Routing and Forwarding (VRF) information in a table (a VRF table) dictating how to route and forward traffic through the shared physical network to support corresponding Virtual Private Networks (VPNs) for the different customers. Typically, the SP network selectively couples the LANs to each other through links created between its PE routers. For the core network, an ingress PE uses BGP functions to determine the egress PE. The ingress PE puts the packet in a two-level Multi Protocol Label Switching (MPLS) stack. The top label is used to tunnel packets to the egress PE to accomplish MPLS forwarding through the core network. The bottom label is used by the egress PE to identify the outgoing route for the packet.

VPNs provide a secured means for transmitting and receiving data between network nodes even though a corresponding physical network supporting propagation of the data is shared by many users (and VPNs). In a typical networking environment used for routing data, the environment may include a number of Customer Edge (CE) routers, a number of Provider Edge (PE) routers and a packet-switched network (PSN). Data, encapsulated in layer-2 frames, may be forwarded from a first CE router to a first PE router, from the first PE router across the PSN to a second PE router, and from the second PE router to a second CE router. A Pseudowire (PW) may be utilized to transfer data across the PSN. A Pseudowire is a mechanism that emulates attributes of a service such as Asynchronous Transfer Mode (ATM), Frame Relay (FR), Point-to-Point Protocol (PPP), High Level Data Link Control (HDLC), Synchronous Optical Network (SONET) Frames or Ethernet over a PSN. The functions provided by the PW include encapsulating Protocol Data Units (PDUs) arriving at an ingress port, carrying them across a path or tunnel, managing their timing and order, and any other operations required to emulate the behavior and characteristics of the particular service. In a particular embodiment, PWs are used to carry ingress layer-2 traffic from an ingress PE router to an egress PE router, and then forward the layer-2 traffic out of an egress port of the egress PE router.

In conventional systems, a PDU (e.g., a frame) traverses the networking environment beginning at a first CE router and ending up at a second CE router. The first CE router sends a layer-2 PDU to an ingress PE router. The ingress PE router receives the PDU and encapsulates the PDU with MPLS labels which are used to identify the individual port/circuit and the egress layer-3 PE router. The encapsulated PDU is then forwarded on the PW, across the packet-switched network, to an egress layer-3 PE router. The egress layer-3 PE router removes the MPLS label that identifies the port/circuit that was added by the ingress PE router and forwards the layer-2 PDU to the second CE router.

SUMMARY

Conventional mechanisms such as those explained above suffer from a variety of deficiencies. One such deficiency is that conventional Pseudowires are limited to only extending between one PE device and another PE device across a PSN.

Embodiments of the invention significantly overcome such deficiencies and provide mechanisms and techniques that provide auto-routing of Multi-hop Pseudowires. A BGP speaker (PE device) can advertise reachability information about another non-BGP speaking switching point router (e.g., a local network device), thereby permitting the extension of a multi-hop Pseudowire beyond a PE device.

In a particular embodiment of a method for auto-routing of multi-hop Pseudowires, the method includes receiving, by a first PE device, routing state for reaching a layer 2 (L2) capable device (e.g., a local network device) from the other L2 capable device. The method also includes populating a first Border Gateway Protocol (BGP) routing table with the routing state of the L2 capable network device which is reachable by way of an address family reserved for L2 endpoint reachability information. The method additionally includes advertising, by the first PE device, the first BGP routing table information within a first Service Provider (SP) network such that a multi-hop Pseudowire is capable of being established which includes the L2 capable device.

Other embodiments include a computer readable medium having computer readable code thereon for providing a method of auto-routing of multi-hop Pseudowires. The medium includes instructions for receiving, by a first PE device, first routing state for reaching a layer 2 (L2) device from the L2 device. The medium also includes instructions for populating a first Border Gateway Protocol (BGP) routing table with the routing state of the L2 capable network device which is reachable by way of an address family reserved for L2 end point reachability information. The medium additionally includes instructions for advertising, by the first PE device, the first BGP table information within a first Service Provider (SP) network such that a multi-hop Pseudowire is capable of being established which includes the L2 device.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method of auto-routing of multi-hop Pseudowires as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method of auto-routing of multi-hop Pseudowires as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, California.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In order to utilize a PW, the PW must first be set up. In order to setup a PW, a Virtual Private Wire Service (VPWS) PE is configured with the Target Attachment identifier of the remote PE and the IP address of the remote PE. The PE then performs a lookup in the local Multi Packet Label Switching Label Forwarding Information Base (MPLS LFIB) for a Next Hop Label Forwarding Entry (NHLFE) that contains a Label Switching Path (LSP) to reach the destination PE. If an LSP is found, the PW is set up. However, if the PE fails to find an LSP, then a lookup is performed in an augmented BGP routing table (or alternatively in a separate L2 route lookup table). This augmented BGP routing table (or separate L2 route lookup table) contains the normal IP routing information learned via BGP, and the additional L2VPN IP route attribute related to the local network device. The separate L2 route lookup table includes L2VPN IP route attributes related to the L2 device.

In BGP, a new Address Family Identifier (AFI), and Sub-address Family Identifier (SAFI) is used to transport an IP route with an extra L2VPN route attribute word. The L2 IP reachability information is stored on a PE either as an extra attribute to an existing routing table, or in a completely separate Layer 2 reachability lookup table. BGP advertises only the reachability information about Layer 2 end points. The Switching Point PE (SPE) IP address is always the BGP next hop entry of the L2 BGP route, which may not be the same IP address as the BGP speaker.

By using BGP Route Targets, or BGP attributes in conjunction with the layer2 IP routes, it is possible to implement policies to direct some PWs destined for a specific PE through a specific SPE, while leaving other PEs to be reached via a general best path.

The net result of this method is a layer2 IP routing table containing IP routes that indicate how to reach the PW end points. This Layer 2 Virtual Routing Table (L2VRT) is populated from IGP/LDP received with L2 attribute information, and from BGP L2 routes received from remote BGP speakers.

In a local area at the edge of the BGP network, local PEs may use an IGP/LDP combination to learn L2 reachability information. In this case the SPE inject a host route into the local IGP/LDP with an "L2 VPWS default route" attribute included in the LDP Forwarding Equivalence Class (FEC). In turn each L2 VPWS PE will also inject in the IGP/LDP a host route with an attached "VPWS Route" L2 attribute.

This reduces the number of routes distributed using the routing distribution protocol by aggregating them by site to a single next-hop reachable address, reduces the amount of local memory required to store routes by a similar factor and reduces the number of PEs distributed to other neighbors since only a next-hop neighbor need be distributed. If a PE is reachable behind that PE, then the next-hop PE can route the traffic to the ultimate PE (the last PE in the path).

Figure 1:
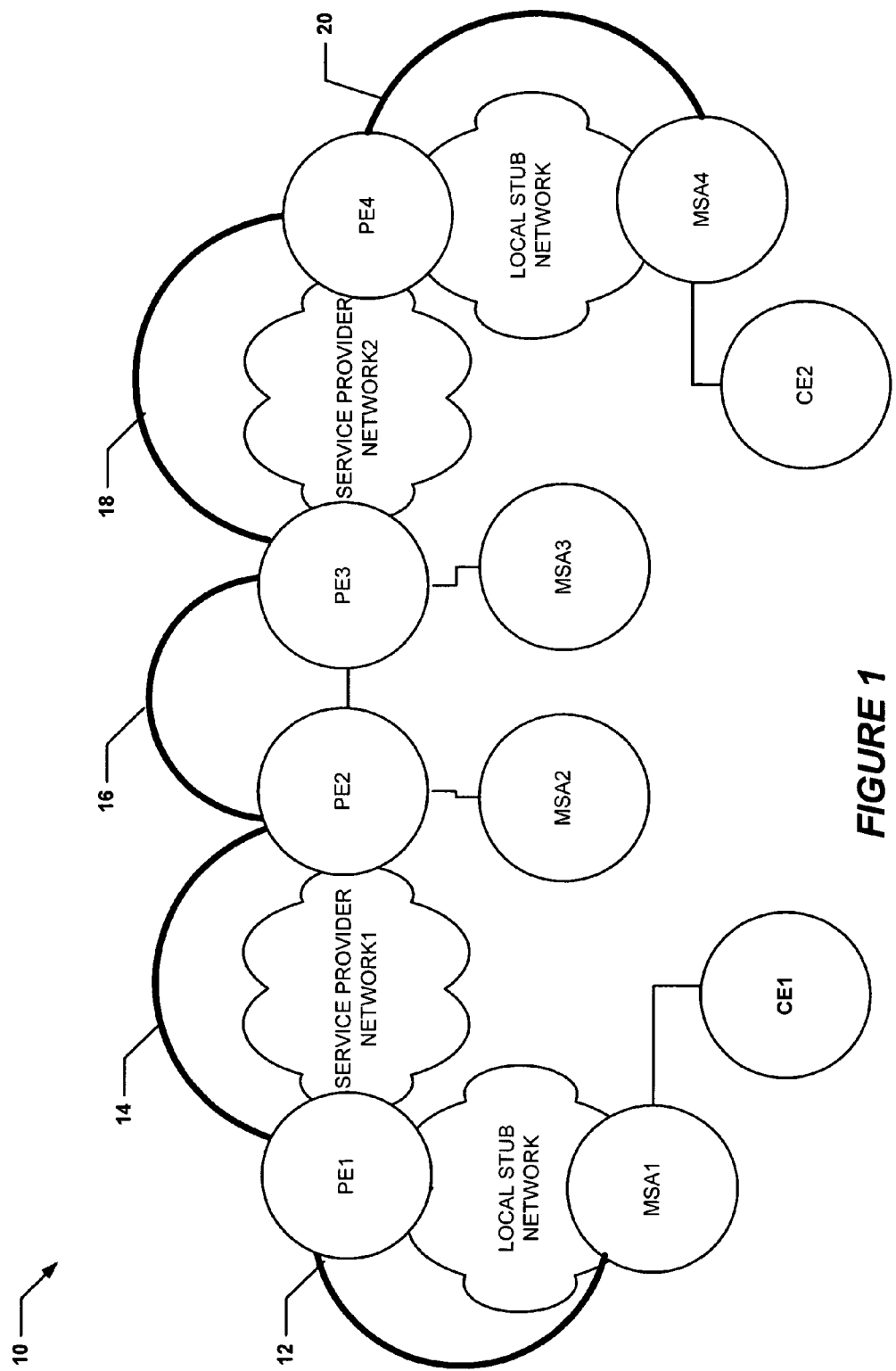
FIG. 1 illustrates an example network topology showing a network having a multi-hop Pseudowire extending from a PE device to a local network device in accordance with embodiments of the present invention.

Referring now to FIG. 1, a network 10 implementing a particular embodiment of the present method for auto routing of multi-hop Pseudowires is shown. In this network 10, a first provider edge router PE1 is shown in communication with a first service provider network (service provider network 1) and a first local network device MSA1. The local network between the device MSA1, and the device PE1 is a local stub network. Also shown is CE1 which is in communication with MSA1.

Also in communication with PE1 is PE2 which communicates with PE1 by way of service provider network 1. PE2 is also in communication with a second local network device MSA2. MSA2 is also in communication via a local stub network (not shown).

PE2 is also in communication with PE3, which is part of a second service provider network (service provider network 2) and is also in communication with a third local network device MSA3. PE3 is further what is in communication with PE4 via service provider network 2. PE4 is also in communication with a fourth local network device MSA4 by way of another local stub network. CE2 is shown in communication with MSA4.

In operation, PE1 receives an advertisement from the local network device MSA1 regarding MSA1's loopback via IGP. The advertisement in this particular embodiment includes first routing state for reaching the L2 device (MSA 1). PE1 uses this advertisement to populate a first Border Gateway Protocol (BGP) table with information for the L2 capable network device MSA1 indicating that the device is reachable by way of an address family reserved for layer 2 end point reachabiltiy information. The entry reflects layer 2 routing state of the local network device and further reflects that the local network device is layer2 virtual private network (VPN) capable. The routing table may be realized as an augmented routing table or may be realized as a separate layer 2 reachability lookup table. A PE device is able to generate an attribute in to a local area network, wherein a bit of the attribute is defined as a Virtual Private LAN Service (VPLS) and the another bit of the attribute is defined as a Virtual Private Wire Service (VPWS) default route bit. The reachability information for L2 devices includes a unique Address Family Identifier and SubAddress Family Identifier (AFI/SAFI) specifically for L2 VPN IP routing state.

PE1 advertises the BGP table information (which includes the routing state for the L2 device) within service provider network 1 such that a multi-hop Pseudowire is capable of being established which includes the local network device MSA1.

PE2 receives the first BGP table information from PE1 and populates its own respective BGP table with the information from the first BGP table as well as with any local network device entries received at PE2. For example, this could include entries from local network device MSA2.

PE2 then advertises its second BGP table information to PE3 which is part of service provider network 2. PE3 receives the second BGP table information from PE2 and populates a third BGP table with information from the second BGP table as well as local network device entries received at PE3 for example, from local network device MSA3.

PE3 then distributes the third BGP table information within service provider network 2 to the PE4. PE4 receives the third BGP table information. The network is now set up to provide a multi-hop Pseudowire which extends from the first local network device MSA1 to MSA4. The multi-hop Pseudowire includes a first Pseudowire segment 12 between the first local network device MSA1 and PE1, a second Pseudowire segment 14 extended between PE1 and PE2, a third Pseudowire segment 16 extended between PE2 and PE3, a fourth Pseudowire 18 segment extended between PE3 and PE4, and a fifth Pseudowire segment 20 extending between PE4 and MSA4. The multihop Pseudowire looks like a single Pseudowire between MSA1 and MSA4.

Figure 2A:
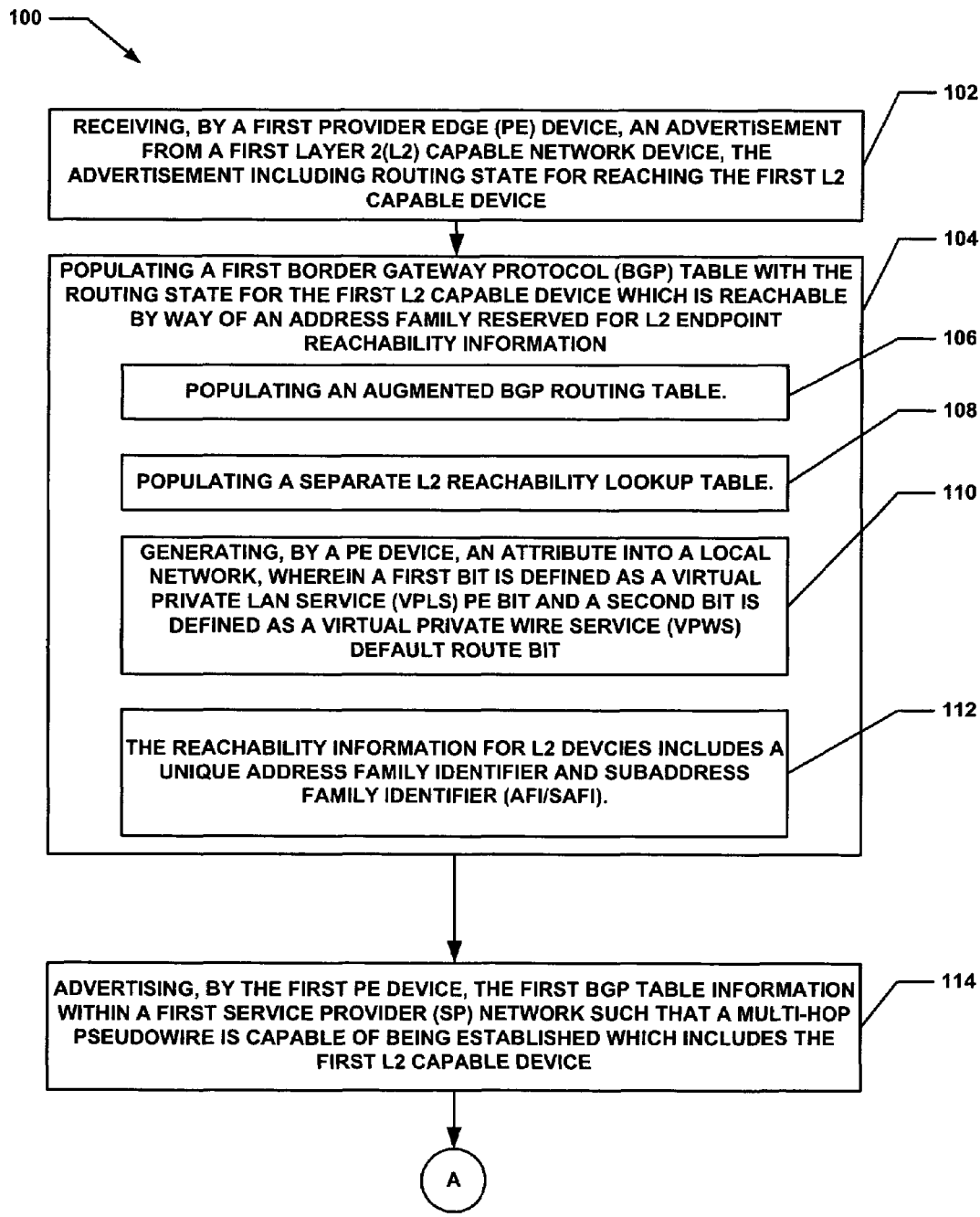
FIGS. 2A and 2B illustrate a flowchart for a particular embodiment of a method of auto-routing of multi-hop Pseudowires in accordance with embodiments of the invention.
Figure 2B:
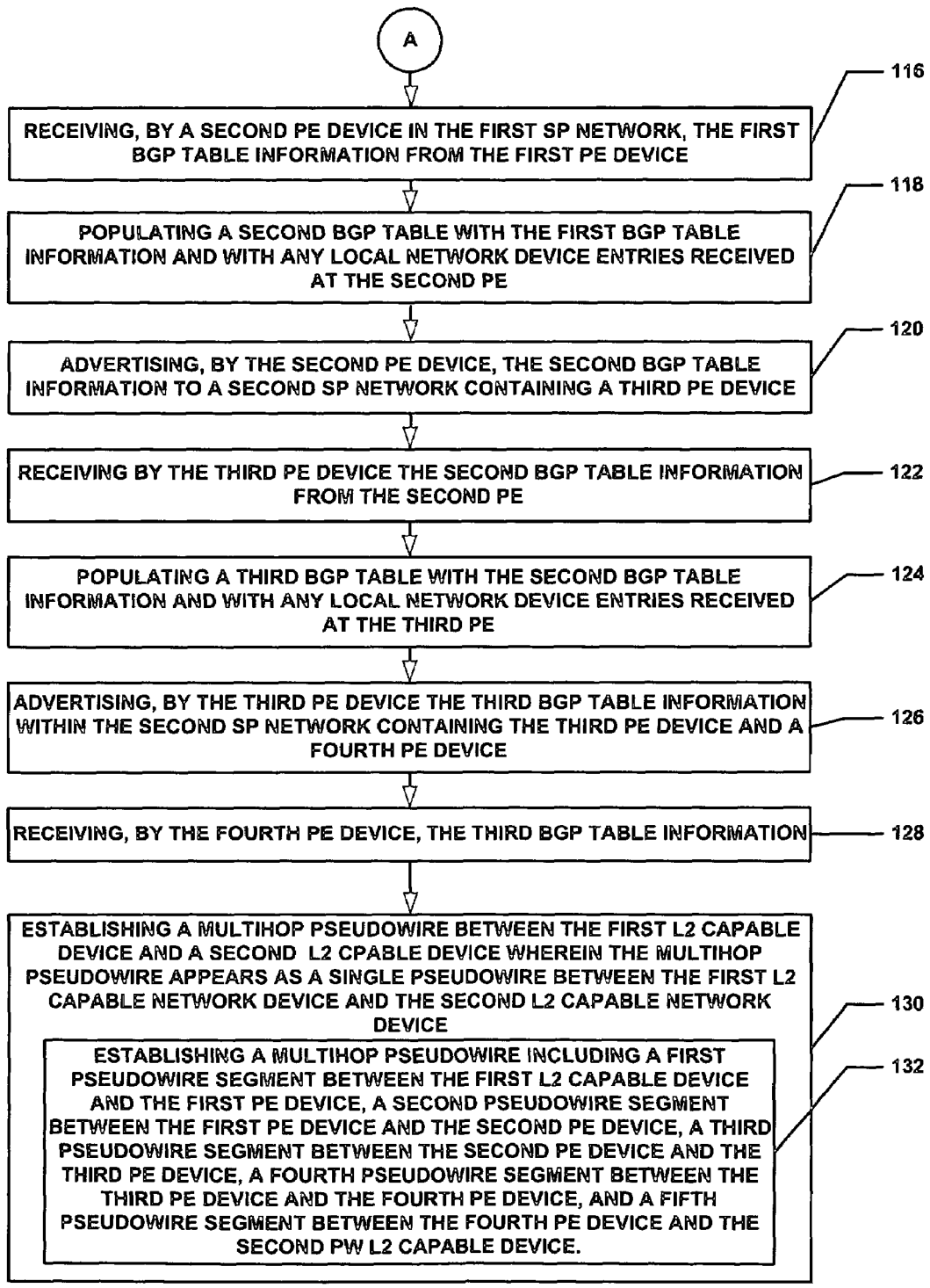

A flow chart of the presently disclosed method is depicted in FIGS. 2A and 2B. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a particular embodiment of a method 100 of auto-routing of multi-hop Pseudowires is shown. The method begins with processing block 102, in which a first Provider Edge (PE) device receives an advertisement from a first layer 2 (L2) capable network device, the advertisement including routing state for reaching the L2 capable network device. This may be done using (Internal Gateway Protocol) IGP or similar type protocol.

In processing block 104, a first Border Gateway Protocol (BGP) table is populated with the routing state for the L2 network device which is reachable by way of an address family reserved for L2 endpoint reachability information. This is performed by the first PE device in the BGP table associated with the first PE device. The populating may be done in an augmented BGP routing table, as shown in processing block 106 or in a separate L2 reachability lookup table, as shown in processing block 108.

Referring now to processing block 110, a PE device can generate an attribute into a local network, wherein a bit is defined as a Virtual Private LAN Service (VPLS) PE bit and another bit is defined as a Virtual Private Wire Service (VPWS) default route bit. As recited by processing block 112, the address family reserved for L2 reachability information includes a unique Address Family Identifier and SubAddress Family Identifier (AFI/SAFI).

In processing block 114, the first PE device advertises the first BGP table information within a first Service Provider (SP) network such that a multi-hop Pseudowire is capable of being established which includes the first L2 capable network device.

Processing block 116 discloses receiving, by a second PE device in the first SP network, the first BGP table information from the first PE device, and processing block 118 recites populating a second BGP table with the first BGP table information and with any local network device entries received at the second PE.

In processing block 120 the second PE device advertises the second BGP table to a second SP network containing a third PE device, while in processing block 122 the third PE device receives the second BGP table information from the second PE. Processing block 124 discloses populating a third BGP table with the second BGP table information and with any local network device entries received at the third PE.

In processing block 126 the third PE device advertises the third BGP table information within the second SP network containing the third PE device and a fourth PE device, and as recited in processing block 128 the fourth PE device receives the third BGP table information.

In processing block 130 a multihop Pseudowire is established between the first L2capable network device and a second L2 capable network device device. The multihop Pseudowire appears as a single Pseudowire between the first L2 capable network device and the second L2 capable network device.

As recited in processing block 132, the establishing of the multihop Pseudowire including establishing a first Pseudowire segment between the first L2 device and the first PE device, a second Pseudowire segment between the first PE device and the second PE device, a third Pseudowire segment between the second PE device and the third PE device, a fourth Pseudowire segment between the third PE device and the fourth PE device, and a fifth Pseudowire segment between the fourth PE device and the second L2 cpable network device.

Figure 3:
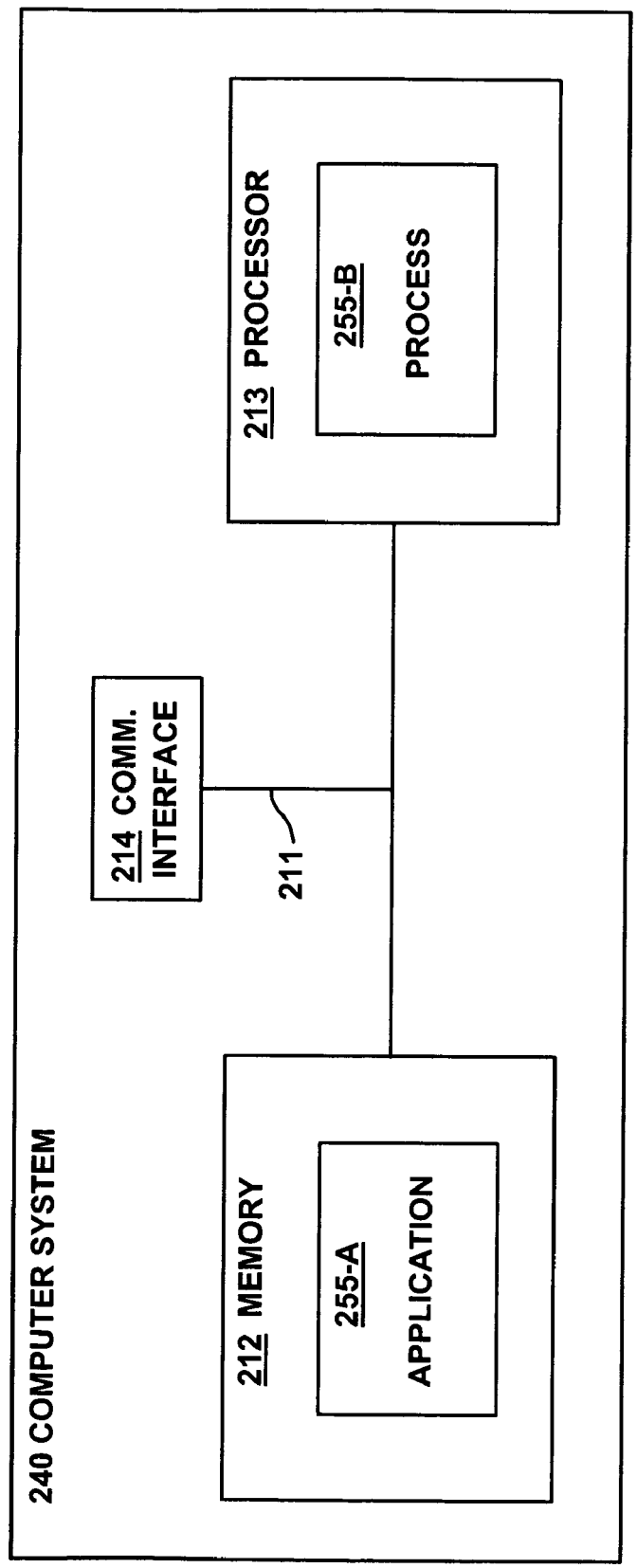
FIG. 3 illustrates an example computer system architecture for a computer system that performs auto-routing of multi-hop Pseudowires in accordance with embodiments of the invention.

FIG. 3 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of auto-routing of multi-hop Pseudowires comprising:
   receiving, by a first Provider Edge (PE) device, an advertisement from a first layer 2 (L2) capable network device, said advertisement including routing state for reaching the L2 device;
   populating a first Border Gateway Protocol (BGP) table with said routing state for said L2 capable network device which is reachable by way of an address family reserved for L2 end point reachability information; and
   advertising, by said first PE device, said first BGP table information within a first Service Provider (SP) network such that a multi-hop Pseudowire is capable of being established which includes said L2 capable device.

2. The method of claim 1 wherein said populating a first BGP table comprises populating an augmented BGP routing table.

3. The method of claim 1 wherein said populating a first BGP table comprises populating a separate L2 reachability lookup table.

4. The method of claim 1 wherein a PE device is able to generate an attribute into a local network wherein a bit is defined as a Virtual Private LAN Service (VPLS) PE bit and another bit is defined as a Virtual Private Wire Service (VPWS) default route bit.

5. The method of claim 4 wherein said reachability information for L2 devices includes a unique Address Family Identifier and SubAddress Family Identifier (AFI/SAFI).

6. The method of claim 1 further comprising:
   receiving, by a second PE device in said first SP network, said first BGP table information from said first PE device; and
   populating a second BGP table with said first BGP table information and with any local network device entries received at said second PE.

7. The method of claim 6 further comprising:
   advertising, by said second PE device, said second BGP table information to a second SP network containing a third PE device;
   receiving, by said third PE device, said second BGP table information from said second PE; and
   populating a third BGP table with said second BGP table information and with any local network device entries received at said third PE.

8. The method of claim 7 further comprising:
   advertising, by said third PE device said third BGP table information within said second SP network containing said third PE device and a fourth PE device; and
   receiving, by said fourth PE device, said third BGP table.

9. The method of claim 1 further comprising establishing a multihop Pseudowire between said first L2 capable network device and a second L2 capable network device and wherein said multihop pseudowire looks like a single Pseudowire between said first L2 capable network device and said second L2 capable network device.

10. The method of claim 9 wherein said establishing a multihop Pseudowire comprises establishing a first Pseudowire segment between said first L2 capable network device and said first PE device, a second Pseudowire segment between said first PE device and said second PE device, a third Pseudowire segment between said second PE device and said third PE device, a fourth Pseudowire segment between said third PE device and said fourth PE device, and a fifth Pseudowire segment between said fourth PE device and said second L2 capable network device.

11. A computer system comprising:
   a memory;
   a processor;
   a communications interface;
   an interconnection mechanism coupling the memory, the processor and the communications interface; and
   wherein the memory is encoded with an application for auto-routing of multi-hop Pseudowires that when performed on the processor, provides a process for processing information, the process causing the computer system to perform the operations of:

receiving, by a first Provider Edge (PE) device, an advertisement from a first layer 2 (L2) capable network device, said advertisement including routing state for reaching the L2 device;

populating a first Border Gateway Protocol (BGP) table with said routing state for said L2 capable network device which is reachable by way of an address family reserved for L2 end point reachability information; and advertising, by said first PE device, said first BGP table information within a first Service Provider (SP) network such that a multi-hop Pseudowire is capable of being established which includes said L2 capable device.

12. The computer system of claim 11 wherein said populating a first BGP table comprises populating an augmented BGP routing table.

13. The computer system of claim 11 wherein said populating a first BGP table comprises populating a separate L2 reachability lookup table.

14. The computer system of claim 11 wherein a PE device is able to generate an attribute into a local network wherein a bit is defined as a Virtual Private LAN Service (VPLS) PE bit and another bit is defined as a Virtual Private Wire Service (VPWS) default route bit.

15. The computer system of claim 14 wherein said reachability information for L2 devices includes a unique Address Family Identifier and SubAddress Family Identifier (AFI/SAFI).

16. The computer system of claim 11, wherein the process causing the computer system to perform the operations further comprises:

receiving, by a second PE device in said first SP network, said first BGP table information from said first PE device; and populating a second BGP table with said first BGP table information and with any local network device entries received at said second PE.

17. The computer system of claim 16 wherein the process causing the computer system to perform the operations further comprises:

advertising, by said second PE device, said second BGP table information to a second SP network containing a third PE device;

receiving, by said third PE device, said second BGP table information from said second PE; and populating a third BGP table with said second BGP table information and with any local network device entries received at said third PE.

18. The computer system of claim 17 wherein the process causing the computer system to perform the operations further comprises:

advertising, by said third PE device said third BGP table information within said second SP network containing said third PE device and a fourth PE device; and receiving, by said fourth PE device, said third BGP table.

19. The computer system of claim 11 wherein the process causing the computer system to perform the operations further comprises: establishing a multihop Pseudowire between said first L2 capable network device and a second L2 capable network device and wherein said multihop pseudowire looks like a single Pseudowire between said first L2 capable network device and said second L2 capable network device.

20. The computer system of claim 19 wherein said establishing a multihop Pseudowire comprises establishing a multihop Pseudowire comprises establishing a first Pseudowire segment between said first L2 capable network device and said first PE device, a second Pseudowire segment between said first PE device and said second PE device, a third Pseudowire segment between said second PE device and said third PE device, a fourth Pseudowire segment between said third PE device and said fourth PE device, and a fifth Pseudowire segment between said fourth PE device and said second L2 capable network device.

21. A system for auto-routing of multi-hop Pseudowires comprising:

means for receiving, by a first Provider Edge (PE) device, an advertisement from a first layer 2 (L2) capable network device, said advertisement including routing state for reaching the L2 device;

means for populating a first Border Gateway Protocol (BGP) table with said routing state for said L2 capable network device which is reachable by way of an address family reserved for L2 end point reachability information; and means for advertising, by said first PE device, said first BGP table information within a first Service Provider (SP) network such that a multi-hop Pseudowire is capable of being established which includes said L2 capable device.

* * * * *